United States Patent
Caine et al.

(10) Patent No.: US 7,642,528 B2
(45) Date of Patent: Jan. 5, 2010

(54) PORTABLE ELECTRONIC DEVICE HAVING APPEARANCE CUSTOMIZABLE HOUSING

(75) Inventors: Michael E. Caine, Needham, MA (US); Thomas E. Gitzinger, Libertyville, IL (US); Manuel Oliver, Scottsdale, AZ (US)

(73) Assignee: Motorola, Inc., Schaumburg, IL (US)

(*) Notice: Subject to any disclaimer, the term of this patent is extended or adjusted under 35 U.S.C. 154(b) by 327 days.

(21) Appl. No.: 11/755,550

(22) Filed: May 30, 2007

(65) Prior Publication Data

US 2008/0296512 A1    Dec. 4, 2008

(51) Int. Cl.
    *A61N 5/00*    (2006.01)
    *G21G 5/00*    (2006.01)
(52) U.S. Cl. ............ 250/492.1; 250/474.1; 250/453.11; 455/90.3; 455/575.1; 455/566; 428/152
(58) Field of Classification Search .............. 250/492.1, 250/474.1, 453.11; 455/90.3, 575.1, 566; 428/152
See application file for complete search history.

(56) References Cited

U.S. PATENT DOCUMENTS

| | | |
|---|---|---|
| 5,776,639 A | 7/1998 | Umeki et al. |
| 7,088,380 B2 | 8/2006 | Bronson |
| 2006/0052063 A1* | 3/2006 | Lohr .................... 455/90.3 |

FOREIGN PATENT DOCUMENTS

| | | | |
|---|---|---|---|
| DE | 20111183 | * | 1/2002 |
| EP | 1383297 A1 | * | 1/2004 |
| WO | 2004021077 A1 | | 3/2004 |

OTHER PUBLICATIONS

International Search Report PCT/US2008/064296 dated Oct. 9, 2008.

* cited by examiner

*Primary Examiner*—Bernard E Souw
*Assistant Examiner*—Meenakshi S Sahu
(74) *Attorney, Agent, or Firm*—Ingrassia Fisher & Lorenz, P.C.; Sylvia Chen

(57) ABSTRACT

A portable electronic device (10) has a customizable housing (20) where a "skin" (22, 72) is provided, wherein the texture and/or color can be changed by a consumer. The portable electronic device (10) is positioned within an apparatus (41, 51, 61) providing a power source for supplying radiant energy such as heat and/or light to the material. The method of customizing a housing (20) encasing electronics of a portable electronic device (10) includes treating the skin (22, 72) within the housing (20) with heat and/or light, and thereby creating at least one of a texture and a color within the skin (22, 72).

20 Claims, 4 Drawing Sheets

PORTABLE ELECTRONIC DEVICE HAVING APPEARANCE CUSTOMIZABLE HOUSING

FIELD

The present disclosure generally relates to portable electronic devices and more particularly to a method and apparatus for customizing the texture and/or color of a portable electronic device housing surface.

BACKGROUND

The market for personal portable electronic devices, for example, cell phones, laptop computers, personal digital assistants (PDAs), digital cameras, and music playback devices (MP3), is very competitive. Manufacturers, distributors, service providers, and third party providers have all attempted to find features that appeal to the consumer. For example, service providers are continually looking to improve cell phone reception and access to the internet for down loading of information, music, and the like. Third party providers are constantly searching for accessories that function well with the manufacture's product. Manufacturers are constantly improving their product with each model in the hopes it will appeal to the consumer more than a competitor's product. Many times these manufacturer's improvements do not relate directly to the functionality of the product.

The look and feel of personal portable electronics devices is now a key product differentiator and one of the most significant reasons that consumers choose specific models. From a business standpoint, outstanding designs (form and appearance) may increase market share and margin.

Consumers are enamored with customizable features, e.g., cell phone ring tones, on portable electronic devices. These features reflect personal style. Consumers select them for some of the same reasons that they select clothing styles, clothing colors, and fashion accessories. These two worlds have not merged because consumers have multiple sets of clothing and generally only one personal electronic device (perhaps of each type), and this device has a single defined color, texture, or shape. In short, consumers have a very limited ability to match colors and patterns of personal electronic devices to their clothing, their accessories, their car, or their mood. Plastic snap-on covers for devices such as cell phones and MP3 players can be purchased in pre-defined patterns and colors. These snap-on covers are quite popular, and yet they provide a limited customization capability.

There is clearly a need for a better solution: a need for a technology that will allow consumers to easily and conveniently match the color and pattern of their portable electronics device to both their moods and wearable items without depleting power from their portable electronics device.

Accordingly, it is desirable to provide a portable electronics device having a thin, color- and/or pattern-customizable housing surface wherein the color and/or pattern can be configured without depleting power from the portable electronics device. Furthermore, other desirable features and characteristics of the present invention will become apparent from the subsequent detailed description and the appended claims, taken in conjunction with the accompanying drawings and this background.

BRIEF DESCRIPTION OF THE DRAWINGS

Embodiments of the present invention will hereinafter be described in conjunction with the following drawing figures, wherein like numerals denote like elements.

DETAILED DESCRIPTION

A portable electronics device having a customizable housing material is provided, wherein the texture, pattern, and/or color can be changed by a consumer (i.e., "end user"). A "pattern" is a decorative design and includes elements of color (or more than one color or shade), shape, and/or texture. The portable electronics device is positioned within an apparatus providing a power source for supplying radiant energy to the material. The method of customizing a housing encasing electronics of a portable electronic device includes treating a material within the housing with heat and/or light, and thereby creating a texture, a pattern and/or a color within the material.

The following detailed description is merely exemplary in nature and is not intended to limit the invention or the application and uses of the invention. Furthermore, there is no intention to be bound by any theory presented in the preceding background or the following detailed description.

The exemplary embodiment described herein gives the consumer control over the colors and textures (and the patterns of the colors and textures) of their portable electronics devices. For electronics devices, a 'skin' (visible surface) changes colors and patterns in response to heat or light created by an apparatus, which may double as a battery charger, and as selected by the consumer. The pattern of the color and/or texture that the skin is to assume may be created by one of several exemplary embodiments.

In an embodiment, this change in color or texture is accomplished while the portable electronic device is in a charger and while the battery of the portable electronic device is being charged, and thus the skin acquires the desired color and texture pattern without consuming any power from the portable electronic device.

In an embodiment, the skin is very thin so that the portable electronic device retains its small, portable form-factor. The skin technology is mechanically robust, since it will be on the outer surface of portable devices that often receive a great deal of handling and abuse. And since cost is a key driver of portable electronic device fabrication, the 'skin' technology is contemplated to be low cost.

Figure 1:
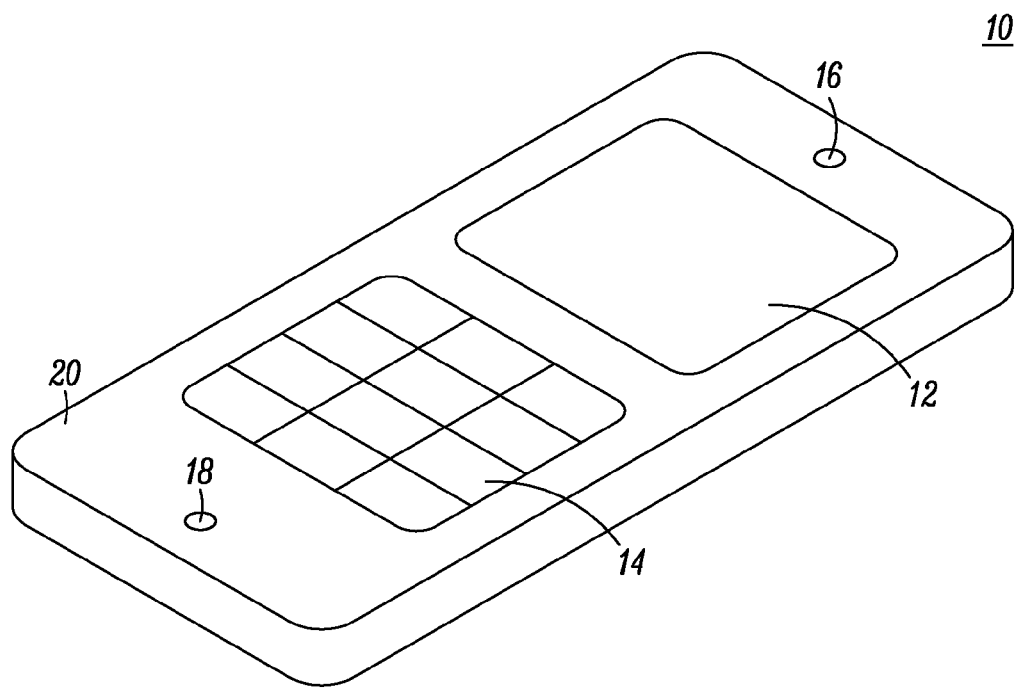
FIG. 1 is an isometric view of a portable electronic device in accordance with exemplary embodiments.

FIG. 1 shows in schematic form a mobile communication device, which may be used with the exemplary embodiments of a portable electronic device 10 described herein, and includes a display 12, a control panel 14, a speaker 16, and a microphone 18 formed within a housing 20. Conventional mobile communication devices also include, for example, an antenna and other inputs which are omitted from the figure for simplicity. Circuitry 19 (shown in block form in FIG. 2) is coupled to each of the display 12, control panel 14, speaker 16, and microphone 18. Although this embodiment describes a mobile communication device, the portable electronic device 10 can take other forms such as a laptop computer, personal digital assistant (PDA), digital camera, or a music playback device (e.g., MP3 player).

Figure 2:
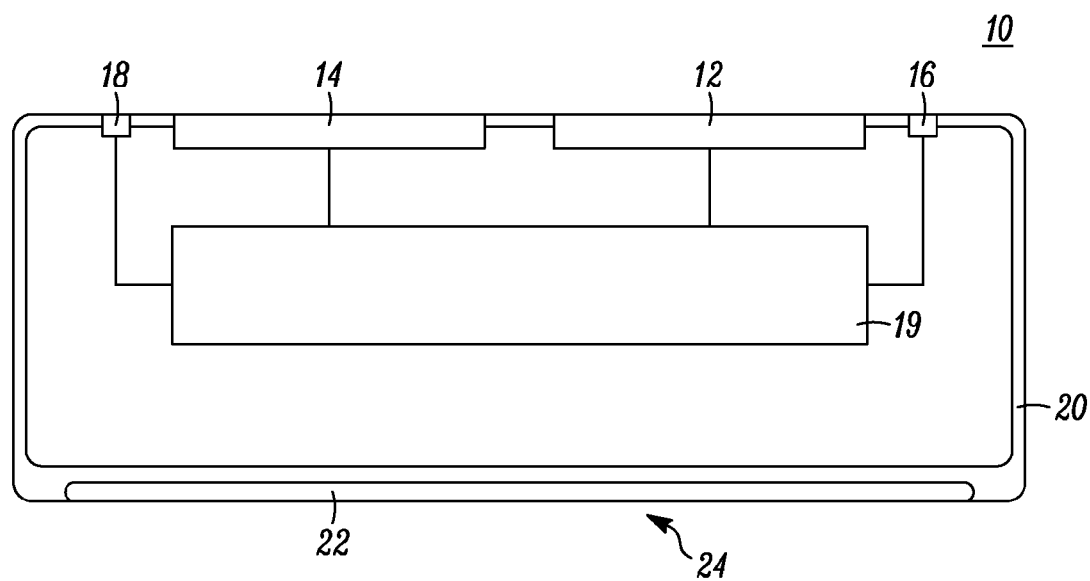
FIG. 2 is a schematic cross section of a portable electronic device in accordance with the exemplary embodiments.
Figure 3:
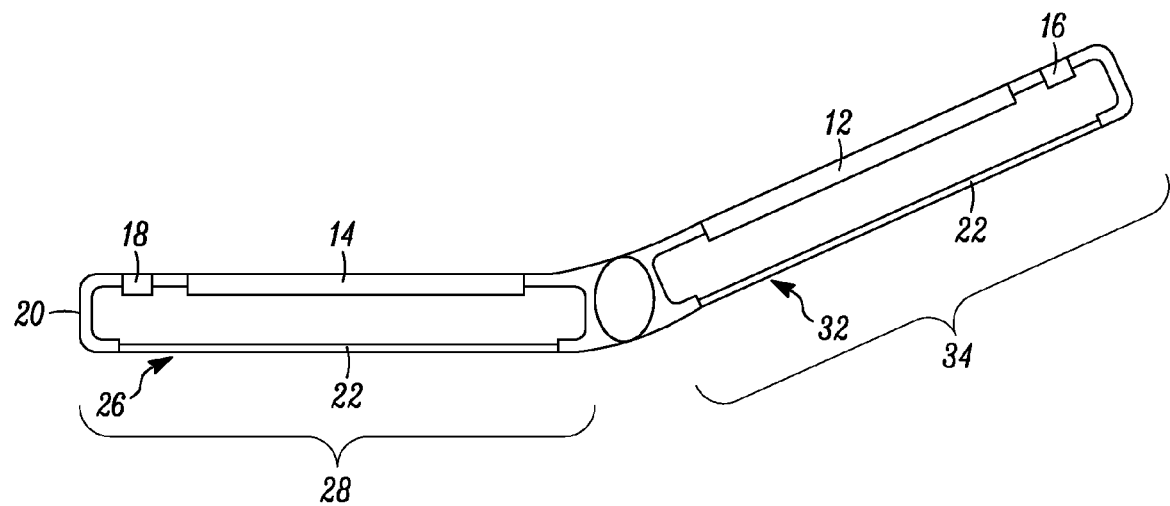
FIG. 3 is a schematic cross section of another portable electronic device having a different form factor in accordance with the exemplary embodiments.

FIG. 2 shows in schematic form a cross section of a portable electronic device 10 in accordance with the exemplary embodiments. The portable electronic device 10 comprises a material, or "skin", 22 on the back surface 24. Although the skin 22 is shown as being positioned within a recess of the housing 20, it may alternatively be positioned on the housing 20 without the recess, or be positioned within an opening defined by the housing 20 (FIG. 3). And, although the skin 22 is shown as only being positioned on the back surface 24, it may cover multiple surfaces of the portable electronic device 10. The composition of the skin 22 will depend on the embodiment as discussed hereinafter.

It is also noted that the portable electronic device 10 may comprise a variety of form factors. For example, a "foldable" cell phone is shown in FIG. 3 wherein the skin 22 is positioned on a back side 26 of the lower portion 28 and/or the back side 32 of the upper portion 34. Thus, when the cell phone is folded, the skin 22 covers most of the external surfaces of the phone.

Figure 4:
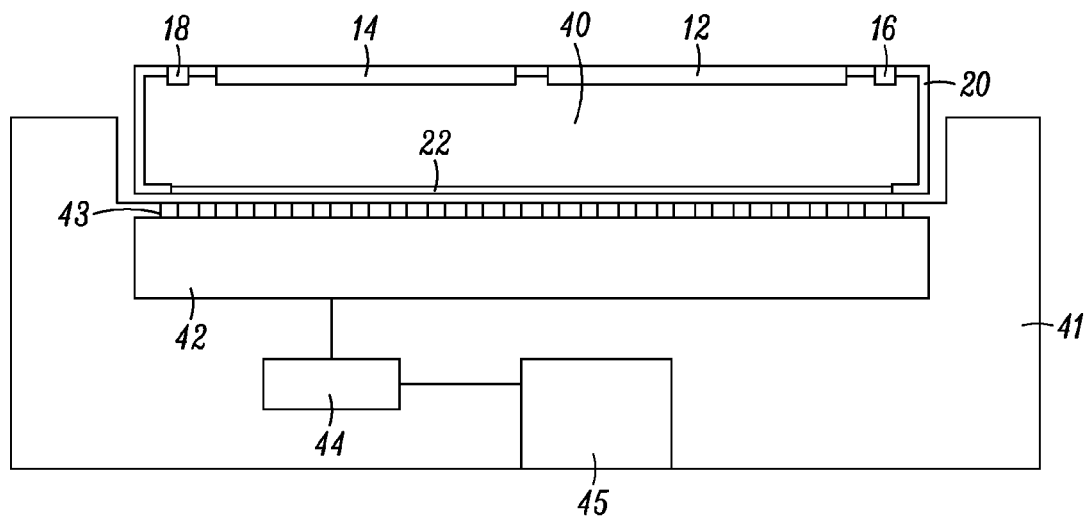
FIG. 4 is a schematic cross section of a first exemplary embodiment.

FIG. 4 is a schematic cross section of the first exemplary embodiment of a portable electronic device 40 resting in an apparatus 41 which includes circuitry 42 coupled to a plurality of addressable electrical conductors 43 that are positioned contiguous to the skin 22. Depending on the embodiment, the electrical conductors 43 can be designed to make contact with the skin 22 or they may be designed to be in close proximity to the skin 22 without actually touching the skin 22. The electrical conductors 43 may be arranged in any form, e.g., a matrix, strips, or discrete islands. The electrical circuitry 42 is coupled to a controller 44 for receiving instructions regarding providing current to the selected conductors in the electrical conductors 43 to form a shape-pattern in the skin 22. An input device 45 may be coupled to the controller 44 for providing instructions to the controller 44 regarding a desired shape-pattern. In an embodiment, the skin 22 is a thermoplastic resin including a gas dissolved therein at high pressure, but may comprise any material that visibly changes shape or color when heated. The gas may comprise, e.g., carbon dioxide ($CO_2$) or nitrogen ($N_2$) or similar gasses. In other embodiments, the skin 22 may include foaming agents, e.g., gas microspheres, liquid microspheres, or chemical foaming agents. Gas microspheres are small spherical plastic particles having a polymer shell encapsulating a gas. When the gas inside the shell is heated, it increases its pressure and the thermoplastic shell softens, resulting in an increase in volume of the microspheres. Liquid microspheres contain a liquid, e.g., a hydrocarbon, in a thermoplastic polymer cell that functions in a similar manner to the gas microspheres. Chemical foaming agents, e.g., celogen, disposed within a resin create a cellular structure that expands upon being heated. The apparatus 41 may also comprise a charger for supplying a charging current to a battery (not shown) within the portable electronic device 40.

In operation, a user of the portable electronic device 40 would place the portable electronic device 40 in the apparatus 41 (cradle) and provide instructions for a desired pattern to the input device 45. These instructions could be downloaded & stored as digital data in memory in either the cradle or the portable electronic device 10. They could also be stored in a medium such as a memory card that could be plugged into the charger. In response to those instructions, the controller 44 would direct current through selected electrical conductors 43. Heat generated by the current through the electrical conductors 43 would reach the skin 22, causing both the thermoplastic resin material to soften and the gas within the skin 22 to expand and a series of bumps, e.g., a texture, to form on the skin 22. The user would then remove the portable electronic device 40 from the apparatus 41 for normal use. Once the portable electronic device 40 is removed from the heat, the shape of the skin will remain until heat is again applied. A different pattern may be selected by repeating the above steps. In the preferred exemplary embodiment, the portable electronic device 40 would remain in the apparatus 41 for a few hours. This could be accomplished, e.g., overnight when the portable electronic device 40 is being charged. The amount of heat for modifying the shape of the skin 22 depends on the composition of the skin 22 material. For skin material comprising polycapratalone the target temperature would be 100 degrees C, and for a material comprising a Pet-G Vivak thermoplastic copolyester sheet the target temperature would be between 120-160 degrees C.

Figure 5:
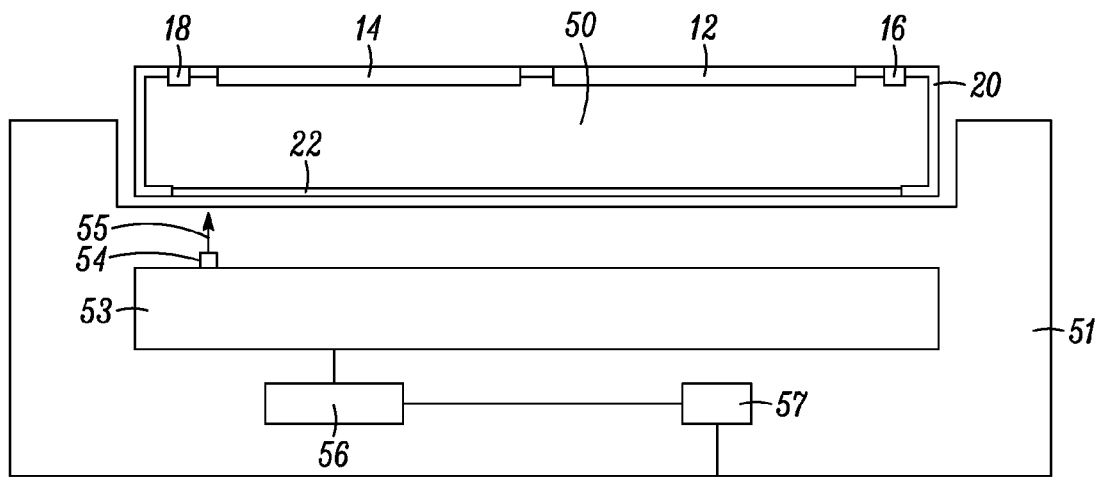
FIG. 5 is a schematic cross section of a second exemplary embodiment.

FIG. 5 is a schematic cross section of the second exemplary embodiment of a portable electronic device 50 resting in an apparatus 51 which includes an optical guidance system 53. The optical guidance system 53 includes a light source 54 that guides a beam of light 55 onto the skin 22 selectively across two dimensions. The light source 54 may be one of a variety of light sources, e.g., a laser, ultraviolet, or infrared. A controller 56 is coupled to the optical system for providing instructions on movement of the light source 54 in response to an input device 57. In an embodiment, the light source 54 would be stationary and a mirror, or a series of mirrors (not shown), would reflect the light 55 from the light source 54 onto the skin 22 in a desired pattern. In another embodiment, the light source 54 would move in two dimensions to create the desired pattern.

In operation, a user of the portable electronic device 50 would place the portable electronic device 50 in the apparatus 51 (cradle) and provide instructions for a desired pattern to the input device 57. In response to those instructions, the controller 56 would direct the optical guidance system 53 to selectively direct the light source 54 to apply light 55 over the skin 22 in a manner to create a desired pattern. As in the first embodiment, the skin 22 preferably comprises a thermoplastic resin including a gas dissolved therein at high pressure, but may comprise any material that changes shape or color when heated. Heat generated by the light 55 striking the skin 22, causes the gas within the skin 22 to expand and a series of bumps, e.g., a texture, to form on the skin 22. The user would then remove the portable electronic device 50 from the apparatus 51 for normal use. After the portable electronic device 50 is removed from the light source 54, the shape of the skin 22 will remain stable until heat is again applied. In the preferred exemplary embodiment, the portable electronic device 50 would remain in the apparatus 51 for a few hours. This could be accomplished, e.g., overnight when the phone is being charged. The amount of heat needed for modifying the shape of the thermoplastic resin "skin" 22 depends on the composition of the skin 22, e.g., a skin 22 comprising polycapratalone need about be 100 degrees C. and a skin 22 comprising a Pet-G Vivak thermoplastic copolyester sheet would need between 120-160 degrees C.

Alternatively or additionally, the skin 22 used in the second embodiment could comprise an photochromic or thermochromic material that can be deposited as a thin film and change color when struck by the light 55. The state of the material may be reversed, thereby allowing the same surface to be rewritten multiple times. Tungsten oxide requires only 2.8 W per square meter to change the color, and only 1 W per square meter to hold the color.

Figure 6:
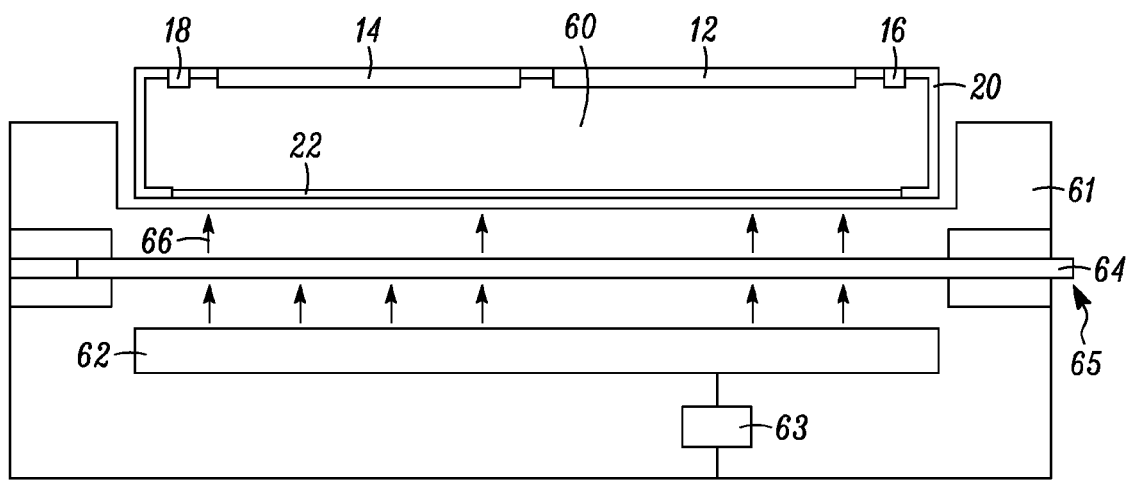
FIG. 6 is a schematic cross section of a third exemplary embodiment.

FIG. 6 is a schematic cross section of the third embodiment of a portable electronic device 60 resting in an apparatus 61 which includes a light source 62 that may be activated by an input device 63. A printed sheet 64 (template) containing a shape-pattern is inserted into the apparatus 61 through a slot 65 to be positioned between the light source 62 and the skin 22. The light source 62 may comprise any light source providing a two-dimensional "sheet" of light 66, but preferably comprises an ultraviolet or infrared light source. The printed sheet 64 may comprise any material defining a shape-pattern such as a plurality of openings (holes), opaque areas, or dark (shaded) areas on or in the printed sheet 64 and may comprise, for example, a sheet of paper that is generally translucent but with opaque ink on selected portions. The skin 22 preferably comprises a thermoplastic resin including a gas dissolved therein at high pressure, but may comprise any material that changes shape or color in a predetermined manner when heated or exposed to radiation of a specific frequency and intensity. The skin 22 used in this third embodiment could comprise a material, e.g., tungsten oxide, that changes color when struck by the light 66.

In operation, the user would place the portable electronic device 60 in the apparatus 61, position the printed sheet 64 within the apparatus 61, and activate the light source 62. Some of the light 66 from the light source 62 would pass through the shape-patterning transparent and/or translucent portions of the printed sheet 64, striking the skin 22. The remainder of the light 66 would not pass through opaque portions of the printed sheet 64. If no printed sheet 64 were inserted, all of the light 66 would strike the skin 22. The light 66 striking the skin 22 would cause the skin 22 to change color and/or develop bumps. Note that the printed sheet 64 may have gradations in opaqueness, so the change in color and/or texture can be gradual or abrupt. The user would then remove the portable electronic device 60 from the apparatus 61 for normal use. In this exemplary embodiment, the portable electronic device 60 would remain in the apparatus 61 for only a few minutes. This could be accomplished, e.g., overnight when the phone is being charged. The printed sheet could be purchased by or given to the user, or downloaded and printed on a standard home printer, such as a bubble ink-jet printer.

Figure 7:
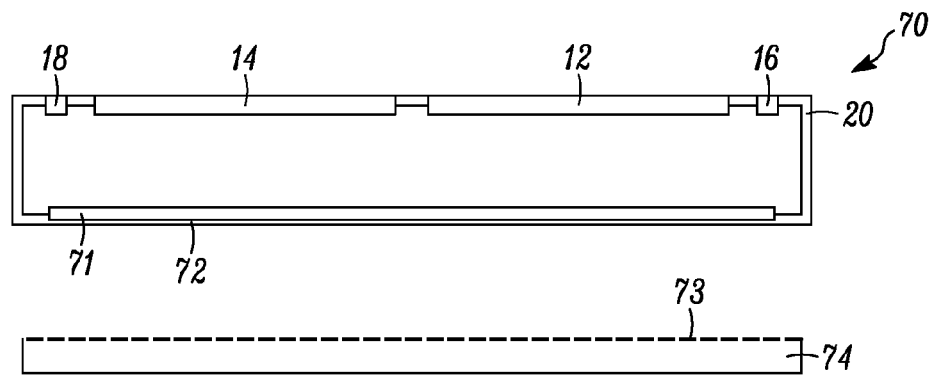
FIG. 7 is a schematic cross section of a fourth exemplary embodiment.

FIG. 7 is a schematic cross section of the fourth exemplary embodiment of a portable electronic device 70 which includes thin or thick film heaters 71 integrated within the portable electronic device 70 and contiguous to the skin 72. The skin 72 may comprise any material that changes its shape due to heat, such as a thermoplastic material called Multicast distributed by A. Algeo Ltd. of the United Kingdom. Multicast is based mainly on polycaprolactone and polyurethane and follows the contours of a pressure template when applied and transforms into a hard structure that does not need reinforcing when cooled. It is light weight, inexpensive, and does not emit toxic gasses or vapors during treatment.

In operation, the user activates the heaters 71 to heat the skin 72 to a temperature preferably within the range of 50 to 80 degrees centigrade which softens the skin 22 of polymer material, e.g., caprolactone. Before the skin 72 cools, it is pressed against a textured surface 73 of a template 74 to create a texture-pattern in the skin 72. Alternatively, before the skin 72 cools, decorative features, e.g., buttons, decals, may be embedded within the skin 72. Furthermore, the heating elements 71 may be positioned in multiple electrically switchable patterns, determined by software, that correspond to desired impressionable patterns on the skin 72.

Figure 8:
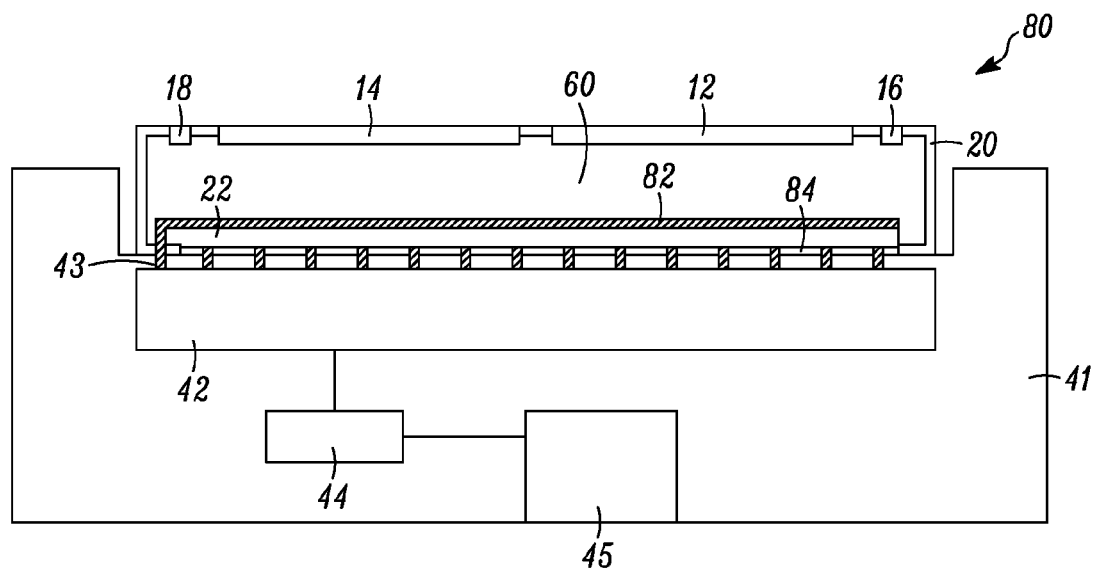
FIG. 8 is a schematic cross section of a fifth exemplary embodiment.

FIG. 8 is a schematic cross section of a fifth exemplary embodiment that utilizes an electrochromic effect, in which the application of a voltage to an electrochromic device results in a color change. Components in FIG. 8 similar to those components in FIG. 4 are identified with the same reference numeral. The skin 22 would contain an electrochromic layer sandwiched between two pairs of electrodes 82, 84. The back electrode 82 on the interior side of the portable electronic device 80 could be continuous. The front electrode 84 on the surface of the housing 20 could be continuous, segmented, or even pixilated at very high resolution. The front electrode 84 is largely transparent, e.g., indium tin oxide, in order that the electrochromic color change is visible. Placement of the portable electronic device 80 in the apparatus 41 would allow the color of the electrochromic layer to be changed. The electrical conductors 43 would contact both the back 82 and front 84 electrodes to effect the change. In the case where there are multiple front electrodes 84, the apparatus 41 would contain either an array of electrodes 43 as shown, or a single electrode, that would be mechanically translated so as to access all of the front electrodes 84.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. An apparatus for customizing an appearance of a portable electronic device having a housing including a material that visibly changes shape, texture or color when heated, the apparatus comprising:
    a system for supplying radiant energy to said material as directed by a consumer to modify a visible property of said material; and
    electrical circuitry configured to be coupled to a power source for supplying power to said system.

2. The apparatus of claim 1 wherein the material is one from a group consisting of:
    polymer, light modifiable material, and photochromic material.

3. The apparatus of claim 2 wherein the material comprises:
    a polymer containing a gas that expands when heated.

4. The apparatus of claim 1 wherein the material comprises thermoplastic resin.

5. The apparatus of claim 1 wherein the material is positioned contiguous to a two-dimensional surface of the system.

6. The apparatus of claim 1 wherein the visible property is at least one of:
    a color and a texture.

7. The apparatus of claim 1 wherein the non-visible energy is in infrared light.

8. The apparatus of claim 1 wherein the non-visible energy is in ultraviolet light.

9. The apparatus of claim 1 wherein the portable electronic device comprises a mobile communication device.

10. The apparatus of claim 1 wherein the portable electronic device includes a battery and the apparatus further comprises:

charging circuitry configured to be coupled to the power source for charging the battery.

11. A method of customizing a housing including a material that visibly changes shape, texture or color when heated, for encasing electronics of a portable electronic device, comprising:

treating said material, within said housing with a radiant energy source as directed by a consumer, and thereby modifying at least one of a shape, texture and a color of the material.

12. A method of claim 11 further comprising:

positioning the portable electronic device at least partially within an apparatus for providing the non-visible energy, wherein the treating provides a light beam.

13. The method of claim 11 further comprising:

directing the non-visible energy through a template.

14. The method of claim 13 wherein the directing comprises:

delivering the non-visible energy through translucent portions of an otherwise opaque template.

15. The method of claim 13 wherein the directing comprises:

absorbing by a portion of the template, a portion of the non-visible energy; and reflecting, from another portion of the template, another portion of the non-visible energy.

16. The method of claim 11 further comprising:

pressing the material against a textured surface.

17. The method of claim 11 wherein the modifying comprising:

creating a color pattern within the material.

18. The method of claim 11 wherein the material comprises:

a foaming agent.

19. The method of claim 18 wherein the foaming agent is selected from one of the group consisting of gas microspheres, liquid microspheres, and chemical foaming agents.

20. The method of claim 1 wherein the non-visible energy is selected from one of the group consisting of infrared and ultraviolet radiation.

* * * * *